United States Patent
Hellstroem et al.

(10) Patent No.: US 10,778,136 B2
(45) Date of Patent: Sep. 15, 2020

(54) DC BUS RIPPLE ELIMINATION FOR MULTIPHASE ELECTRIC MACHINES

(71) Applicant: AROS ELECTRONICS AB, Molndal (SE)

(72) Inventors: Jerker Hellstroem, Molndal (SE); Oskar Josefsson, Miilndal (SE); Daniel Chadstrom, Miilndal (SE)

(73) Assignee: AROS ELECTRONICS AB (SE)

( * ) Notice: Subject to any disclaimer, the term of this patent is extended or adjusted under 35 U.S.C. 154(b) by 0 days.

(21) Appl. No.: 16/345,870

(22) PCT Filed: Nov. 10, 2017

(86) PCT No.: PCT/EP2017/078893
§ 371 (c)(1),
(2) Date: Apr. 29, 2019

(87) PCT Pub. No.: WO2018/091368
PCT Pub. Date: May 24, 2018

(65) Prior Publication Data
US 2019/0253019 A1 Aug. 15, 2019

(30) Foreign Application Priority Data
Nov. 18, 2016 (EP) .................................... 16199486

(51) Int. Cl.
*H02P 29/50* (2016.01)
*H02P 27/08* (2006.01)
(Continued)

(52) U.S. Cl.
CPC .............. *H02P 29/50* (2016.02); *H02M 1/14* (2013.01); *H02M 7/493* (2013.01);
(Continued)

(58) Field of Classification Search
CPC ......... H02P 29/50; H02P 27/085; H02P 25/22
(Continued)

(56) References Cited

U.S. PATENT DOCUMENTS

| 7,659,679 B2* | 2/2010 | Raja ...................... B62D 5/046 318/484 |
|---|---|---|
| 2014/0328091 A1 | 11/2014 | Sakakibara et al. |
| 2014/0361613 A1 | 12/2014 | Huang et al. |

OTHER PUBLICATIONS

Ivana Milosavijevic: "Power Electronics System Communications", etd=021299-141947, Jan. 14, 1999 (Jan. 14, 1999), pates i-92, XP055324789, Virginia Tech's Electronic Theses and Dissertations—https://theses.lib.vt.edu/theses/available/edt-021299-141947/ Retrieved from the Internet: URL: https://theses.liv.vt.edu/theses/available/edd-021299-141947/unrestricted/IMTHESIS.PDF [retrieved on Nov. 30, 2016] pp. 42(4-35), paragraph middle part; figure 4.1.

(Continued)

*Primary Examiner* — David Luo
(74) *Attorney, Agent, or Firm* — Tarolli, Sundheim, Covell & Tummino LLP (57) ABSTRACT

A multiphase electric motor system and a method for controlling a multiphase electric motor system are disclosed. The method for controlling the multiphase electric motor system includes modulating a plurality of carrier signals with a plurality of modulation signals in order to generate a multiphase motor supply signal having a modulated phase signal for each phase of the electric motor. A set of time windows is defined in each period of the multiphase motor supply signal, where an individually selected group of modulated phase signals is modified by delaying the associated carrier signal in each time window, thereby generating a shifted multiphase motor supply signal and providing an efficient DC bus ripple reduction. Hereby, it is e.g. possible to use small filter capacitors/capacitor banks in electrical motor systems. An analogous multiphase electric generator (Continued)

system and method for controlling a multiphase electric generator system are disclosed.

13 Claims, 4 Drawing Sheets

(51) Int. Cl.
    *H02M 1/14*     (2006.01)
    *H02M 7/5395*     (2006.01)
    *H02M 7/493*     (2007.01)
    *H02P 25/22*     (2006.01)

(52) U.S. Cl.
    CPC .......... *H02M 7/5395* (2013.01); *H02P 25/22* (2013.01); *H02P 27/085* (2013.01)

(58) Field of Classification Search
    USPC .............................. 318/400.13, 400.01, 700
    See application file for complete search history.

(56) References Cited

OTHER PUBLICATIONS

Colak I et al; "High Frequency Resonant DC Link PWM Inverter", 7th Mediterranean Electrotechnical Conference: Proceedings: Apr. 12-14, 1994, Hotel Dedeman, Antalya, Tu, IEEE Service Center, Piscataway, NG, Apr. 12, 1994 (Apr. 12, 1994), pp. 1251-1254, XP0101330672, DOI: 10.1109/MELCOM.1994.380839, ISBN: 978-0-7803-1772-7, p. 2, right-hand column, paragraph bottom part; figure 6.

International Search Report for PCT/EP2017/078893 dated Jan. 24, 2018.

* cited by examiner

DC BUS RIPPLE ELIMINATION FOR MULTIPHASE ELECTRIC MACHINES

RELATED APPLICATIONS

The present invention is a U.S. National Stage under 35 USC 371 patent application, claiming priority to Serial No. PCT/EP2017/078893, filed on 10 Nov. 2017; which claims priority of EP 16199486.8, filed on 18 Nov. 2016, the entirety of both of which are incorporated herein by reference.

TECHNICAL FIELD OF THE INVENTION

The present invention relates to multiphase electric machines such as multiphase electric motors or multiphase electric generators, and more specifically to control methods for DC bus ripple reduction in systems comprising such machines.

BACKGROUND

In recent years, an increasing amount of resources are used towards providing environmentally friendly solutions in many fields of technology, particularly, in the automotive field. Electric vehicles, such as e.g. hybrid electric vehicles, fuel cell powered vehicles and battery powered vehicles, are rapidly increasing in popularity due to immense advancements being made in propulsion range, power and reliability of the vehicle, so to reach the long term goal of reducing crude oil consumption and emission of harmful pollutants and green-house gas in the world.

A conventional electric motor system consists of a power source, a rectifier with a filter capacitor in case of an AC-feed (alternating current feed), or just a filter capacitor in case of a DC-feed (direct current feed) and an inverter (motor control circuit). Pulse Width Modulation (PWM) techniques have long been used to improve performance and reliability of power conversion devices and are often used to generate alternating current to the motor in electric vehicles. PWM schemes are used to adjust the amplitude and frequency of the fundamental component of the inverter output and while doing so current is momentarily fed to the motor via the inverter circuit, however, even though that the inductance present in the winding(s) of the motor slows down the rush of current to the motor, there will still be a commutation of inductive current in the motor to momentary current from the feeding circuit, which will result in large ripple AC components over the DC bus. Similar problems also occur if the electric motor is operated as a generator using the same setup but operating the inverter circuit as an active rectifier.

The conventional way to handle the, often harmful, voltage ripple over the DC bus has been to introduce very large capacitors configured to absorb the DC bus ripple. However, currently available capacitors with the required capacitance are associated with many problems such as cost, size and reliability. Often electrolytic capacitors must be used which increase weight/size of the system, severely reduce the overall life-time of the system and also exhibit poor performance under the ambient conditions present in automotive applications resulting in a need for complex and often expensive adaptations of the whole system.

To this end, there have been some attempts to mitigate some of the problems discussed in the foregoing. For example, U.S. Pat. No. 8,115,433 teaches a system and method for controlling a power inverter using phase-shifted carrier signals for an electric motor having two sets of windings, the phase shift being based on the switching frequency (carrier frequency). Each set of windings is fed by two independent motor signals which are modulated by the two separate and phase-shifted carrier signals. A similar system and method is disclosed in U.S. Pat. No. 8,373,372, i.e. it requires a motor that has two sets of windings. Such systems consequently require two independent drive systems, in other words two times as many components and connection points, which adds to the cost and complexity of the system.

There is therefore a need for an improved method and system for electric motor/generator control, particularly, in automotive applications, to meet the cost, size and lifetime requirements for electric vehicles. Even though the above discussion is focused on electric vehicles, similar situations and problems are encountered in many other types of rotary electric machine applications.

SUMMARY OF THE INVENTION

It is therefore an object of the present invention to provide a multiphase electric motor/generator system and a method for controlling a multiphase electric motor/generator system which alleviates all or at least some of the above-discussed drawbacks of the presently known systems.

This object is achieved by means of an electric motor/generator control method and system as defined in the appended claims.

According to a first aspect of the present invention, there is provided a method for controlling a multiphase electric motor system comprising an inverter circuit coupled to a multiphase electric motor having 2N+1 phases, where N is a positive integer larger than 0. The method comprises:

modulating a plurality of carrier signals with a plurality of modulation signals in order to generate a multiphase motor supply signal comprising a modulated phase signal for each of the 2N+1 phases;

defining a set of time windows in each period of the multiphase motor supply signal;

in each time window, modifying a selected group of modulated phase signals by adding a time offset to the carrier signal used to modulated the selected group of modulated signals, thereby generating a shifted multiphase motor supply signal;

wherein said selected group includes different modulated phase signals in at least two different time windows in said set of time windows;

supplying the shifted multiphase motor supply signal to the multiphase electric motor.

Hereby a method for efficiently reducing the DC bus ripple in a multiphase electric motor system is presented. The inventive method diminishes the need for large, and often electrolytic, capacitors, which translates into reduced system size, increased system robustness and lower costs. Moreover, energy losses are reduced because of reduced current magnitudes in switches and feeding circuitry.

The inventive method is directed towards controlling multiphase electric machines, such as, multiphase electric motors having an odd number of phases but at least three phases, i.e. three phase motors, five phase motors, seven phase motors, etc. Thus the term "multiphase motor supply signal" can for example, be understood as a three-phase supply signal, a five-phase supply signal, a seven-phase supply signal, etc. depending on if N=1, 2 or 3, etc. For example, a three phase supply signal can be interpreted as a signal supplied via at least three conductors carrying alternating current voltages that are offset in time by one-third of a period, similarly a five phase supply signal it is a signal supplied via at least five conductors carrying alternating current voltages that are offset in time by one-fifth of a period between "adjacent" phases, and so on. However, it is considered that the skilled person in the relevant technical field readily understands the basic principles of the multiphase AC signals and will, for the sake of brevity, not be further discussed. For example, it is considered to be understood that a period time of any of the modulated phase signals (may also be referred to as phase currents) is the same as the resulting multiphase motor supply signal or the modulation signals.

The inverter circuit may be configured to provide a modulated signal (modulated phase signal) for controlling a multiphase AC-motor, but it may alternatively be configured to provide a modulated signal suited for controlling a BLDC-motor. Any known method for supplying a modulated signal may be used; preferably the electrical motor is controlled with pulse width modulation (PWM) which is widely known in the art. The modulation may for example be controlled by a controller. For the sake of brevity, conventional techniques related to signaling, current sensing, motor control and other functional aspects of the system are not described in detail, however, one having ordinary skill in the relevant art will readily recognize that the invention can be practiced without one or more of the specific details.

The present inventors realized that by "sequentially" adding a relatively small time offset to a select group of carrier signals (each associated with a specific phase of the electric motor), and more specifically by performing this "selection" sequentially throughout each period of the supply signal, the large voltage variations across the feed can be reduced. A group is in the present context to be interpreted as one or more signals. In more detail, it was realized that the dominating frequency component of the unwanted DC bus ripple is often either two times the carrier frequency ($2^{nd}$ harmonic or the first overtone of the carrier frequency), or, if the resonance frequency of the system is close to the carrier frequency, the dominating frequency component is the resonance frequency.

The carrier frequency (or switching frequency) is the frequency of the carrier wave used for the signal modulation in the inverter circuit, and the resonance frequency of the system is dependent on the capacitance of the filter (DC bus capacitor) and the inductance of the cables/wiring connecting the DC bus capacitor to the DC source and the inverter circuit.

Thus, the modulating a plurality of carrier signals, may be understood as modulating two different carrier signals (being phase shifted relative each other) with two different groups of modulation signals in order to form a shifted multiphase motor supply signal.

Therefore, by adding a time offset to one or more of the carrier signals which are used to modulate the phase current signals supplied to the different phases of the motor, the DC bus ripple can be reduced. Particularly if this time offset corresponds to 180° of the dominating frequency component of the DC bus ripple, which in many cases will translate to a time offset corresponding to 90° of the carrier frequency (180° of the second harmonic).

Furthermore, the present inventors further realized that in a system having an odd number of phases the DC ripple problem becomes more complex, since there are no dual sets of windings, the electric motor cannot be divided into two halves which are constantly supplied with independent and offset carrier signals. In other words, one cannot apply a constant time offset to one or more of the carrier signals in asymmetrical electric machines (i.e. electrical machines having 3, 5, 7, or 9 phases and only one set of phase windings). Therefore, by providing a set of time windows for each period of the multiphase motor supply signal (formed by the 2N+1 modulated phase signals), and for each individual time window select or form a group or combination of carrier signals to which a time offset is added many advantageous effects can be achieved, such as, e.g. DC bus ripple reduction (both in terms of maximum voltage ripple and the RMS value of the current ripple), reduced current magnitudes in the semiconductors and reduced currents in the feed/supply circuit. Thus, it can be said that the selected group of carrier signals is individually chosen in each time window in order to reduce DC bus ripple. Since the added time offset is applied to the carrier signals used to generate the modulations signals or phase currents, they are left unaffected by the offset, thus the term shifted multiphase motor supply signal can be understood as a modified or adjusted multiphase motor supply signal, as it is merely the intermediate PWM signal (used to control the gates of the switches in the inverter circuit) that is offset in time. Moreover, the added time offset is relatively small in comparison to the period time of the modulation signals/motor supply signal, μs versus ms, so the overall operation of the electric motor is relatively unaffected.

The term time window can be understood as a set of predefined ranges provided in each period of the multiphase motor supply signal. For example, providing six time windows in a three phase motor supply signal would result in a time window between 0° and 60°, a time window between 60° and 120°, a time window between 120° and 180°, and so on. However, the first time window does not need to begin at 0°, an arbitrary starting point (motor starting position) may be selected, e.g. 37°, then there would be a time window, according to the previous example, between 37° and 97°, a time window between 97° and 157° and a time window between 157° and 217°, and so on.

As an example, the step of modifying a selected group of modulated phase signals:

For each time window, a time offset is added to a one or more carrier signals in reference to the other/remaining carrier signal(s), and in a subsequent time window a time offset is added to one or more of the carrier signals in reference to the other/remaining carrier signal(s), different from the modulated signals subjected to a time offset in the previous time window. Thus, for each time window, an individual assessment of which carrier signals to be subjected to a time offset is performed.

For example, in a three phase electric motor system, the modulated phase signals are denoted as A, B and C. In one of the time windows the inventive method includes modifying A by adding a time offset to the carrier signal used to generate A. This will result in a phase difference between the carrier signal used to generate A and the carrier signals used to generate B (and C). Continuingly, in a second time window, the time offset is added to the carrier signal used to generate C in reference to the carrier signal used to generate A and B.

In accordance with an embodiment of the present invention, the step of modifying a selected group of modulated phase signals is performed during the modulation of the plurality of carrier signals. In other words, for each time window, one or more of the modulated signals is/are generated by means of a carrier signal which is offset (e.g. by 90°) in reference to the carrier signal used to generate the remaining other modulated signals. The following modulation of the supply voltage using these two offset carrier signals will generate a shifted multiphase motor supply signal.

Further, in accordance with another embodiment of the present invention, the set of time windows comprises at least 2(2N+1) time windows. In other words, if the multiphase electric motor is a five phase electric motor, then the method includes a step of providing at least 10 time windows in each period of the motor supply signal, or 14 time windows for a seven phase electric motor, and so on. Moreover, each time window can for example be selected to begin at each zero-crossing of the multiphase signal, i.e. at a moment in time where the current magnitude of one of the modulated signals/phase currents is 0 Ampere.

Even Further, and in accordance with another embodiment of the present invention, the selected group of modulated phase signals is chosen, in each time window, such that a sum of a total current value of the selected group and the total current value of the remaining modulated phase signals, at a predefined moment in time in said each time window, is within the range of ±15% of a full load motor current.

In other words, if the full-load motor current is at 25 A, then each group of modulated signals are formed such that the sum of the total current value of the formed group and the total current value of the remaining modulated signals is within the range of −3.75 A and +3.75 A, and preferably as close to 0 A as possible. The predefined moment in time can be arbitrarily selected, but may for example be during a zero crossing of one of the modulated signals if each time window begins at each zero-crossing of the multiphase signal. The full load motor current is in the present context the maximum current that an electrical machine can draw/supply safely by meeting (either supplying or consuming) the full-load conditions.

Further, in accordance with yet another embodiment of the present invention, the selected group of modulated signals comprises N or N+1 modulated signals.

For example, in a three phase electrical motor this would mean that one modulated phase signal is modified in reference to the remaining two, or that two modulated phase signals are modified in reference to the remaining one. Analogously, in a five phase electrical motor it would result in either modifying two signals in reference to the remaining three, or modifying three signals in reference to the remaining two. Modified is as mentioned in the present context to be understood as that a time offset (or phase shift) is added the carrier signal used to generate that or those modulate phase signal(s).

Thus, for a three phase system having a signal vector [A, B, C]=k*[1, −½, −½], then, if the selected group of modulated signals comprises N(=1) modulated signals, suitably the selected group comprises A and the remaining modulated signals are accordingly B and C. Analogously, if the selected group of modulated signals comprises N+1(=2) modulated signals, suitably the selected group comprises B and C, and the remaining modulated signal is accordingly A.

Even further, in accordance with yet another embodiment of the present invention the multiphase electric motor system further comprises a DC source connected to the inverter circuit and a DC bus filter connected in parallel with the DC source and the inverter circuit by conductors, wherein said method further comprises:

determining the resonance frequency of the system by measuring the resonance frequency of the system, said resonance frequency being dependent on a capacitance of said DC bus filter and an inductance of said conductors.

The "DC source" may comprise any device providing a direct current without a need for a rectifying device, such as e.g. batteries, fuel cells, fuel cell stacks, solar cells, an ultra-cell capacitor or any other equivalent solution useable as a voltage source. Alternatively, the DC source may also comprise an alternating current (AC) source and a rectifier circuit. The rectifier circuit may be a half-wave rectifier, but preferably a full-wave rectifier and the circuit may be arranged in various ways as known in the art using semi-conductor devices such as e.g. junction diodes, Schottky diodes, thyristors, etc. The DC source is used to provide a supply voltage to the inverter circuit.

A filter is preferably connected in parallel with the DC source, for example in parallel with a battery and the inverter circuit. Accordingly, the filter may be connected in parallel with the rectifier circuit if an underlying AC source is used. The filter may be any type of capacitor, often called a DC bus filter or DC bus capacitor, and it is generally required for filtering or absorbing the often harmful voltage ripple on a DC bus voltage line. The filter may be a single filter capacitor; however, any filter capacitor circuit which provides the functionality of a single filter capacitor may be used.

The resonance frequency of the system can for example be measured by sending a pulse across the feed circuit and then deriving a frequency value from the resulting oscillating waveform. The time offset may correspond to 90° of a carrier frequency of the inverter circuit or 180° of a resonance frequency of the system, depending on if the dominating frequency component of the voltage/current ripple across the DC bus filter is the second harmonic of the carrier frequency or the resonance frequency of the system, respectively. This is in order to make the control method more versatile and dynamic and accordingly suitable in situations where the resonance frequency of the system is the dominant frequency component of the DC bus ripple, which is the case when the capacitance of the DC bus filter is relatively low.

In accordance with another aspect of the present invention, there is provided a method for controlling a multiphase electric generator system comprising an active rectifier circuit coupled to a multiphase electric generator having 2N+1 phases, where N is a positive integer larger than 0. The method comprises:

providing a multiphase generator signal from the electric generator to the active rectifier circuit, wherein the multiphase generator signal includes 2N+1 phase signals;

providing a set of time windows in each period of the multiphase generator signal;

comparing a plurality of carrier signals with each of said 2N+1 phase signals in order to generate rectified DC output, wherein each carrier signal is associated with a specific phase signal;

in each time window, adding a time offset to a selected group of carrier signals, thereby generating a shifted rectified DC output;

wherein said selected group includes different carrier signals in at least two different time windows in said set of time windows;

supplying the shifted rectified DC output to a DC load.

In more detail, this aspect of the invention relies on the same inventive concept and utilizes the same principles, the difference being in that the multiphase electric motor is operated as a multiphase electric generator instead, in order to for example charge a battery, c.f. hybrid electric vehicles.

The circuit setup is the same as in the previous aspect of the present invention, but the inverter circuit is utilized as an active rectifier (synchronous rectifier), i.e. a rectifier comprising active components such as e.g. transistors. By using a synchronous rectifier, a path back towards the voltage source may be opened for the current, so to e.g. open up for regenerative braking systems.

With this aspect of the invention, similar advantages and preferred features are present as in the previously discussed first aspect of the invention.

Further, and in accordance with another aspect of the invention, there is provided an electric motor system comprising a DC source and a DC bus filter connected by conductors in parallel with the DC source, said conductors having an inductance. The system further has an electric motor having 2N+1 phases, where N is a positive integer larger than 0, and an inverter circuit connected between the filter and the electric motor, said inverter circuit comprising a plurality of switches. Moreover the electric motor system includes a controller configured to:
  modulate a plurality of carrier signals with a plurality of modulation signals in order to generate a multiphase motor supply signal comprising a modulated phase signal for each of the 2N+1 phases;
  define a set of time windows in each period of the multiphase motor supply signal;
  in each time window, modify a selected group of modulated phase signals by adding a time offset to the carrier signal used to modulated the selected group of modulated signals, thereby generating a shifted multiphase motor supply signal;
  wherein said selected group includes different modulated phase signals in at least two different time windows in said set of time windows;
  generate control signals for the plurality of switches so to supply the shifted multiphase motor supply signal to the multiphase electric motor.

Hereby an electric motor system system having reduced voltage and current ripple across the DC bus is presented. Consequently, the inventive electric motor system is more cost-efficient and robust, as compared to prior known systems, since the requirements on the DC bus filter/capacitor are reduced. Moreover, the inventive system is more efficient than prior known solutions since losses are reduced as a result of reduced current magnitudes in switches and feeding circuitry.

With this aspect of the invention, similar advantages and preferred features are present as in the previously discussed aspects of the invention, and vice versa.

In an embodiment of the present invention, the controller is further configured to:
  form said selected group of modulated signals, in each time window, such that a sum of a total current value of the selected group and the total current value of the remaining modulated signals, at a predefined moment in time in said each time window, is within the range of ±15% of a full load motor current.

Even further, and in accordance with another aspect of the present invention, there is provided an electric generator system comprising a DC load and a DC bus filter connected by conductors in parallel with the load, said conductors having an inductance. The generator system further has a multiphase electric generator having 2N+1 phases, where N is a positive integer larger than 0, and an active rectifier circuit connected between the filter and the electric generator, said active rectifier circuit comprising a plurality of switches, where the multiphase generator is configured to provide a multiphase generator signal to the active rectifier circuit, said multiphase generator signal including 2N+1 phase signals. Moreover, the generator system includes a controller configured to:
  provide a set of time windows in each period of the multiphase generator signal;
  compare a plurality of carrier signals with each of said 2N+1 phase signals in order to generate a rectified DC output, wherein each carrier signal is associated with a specific phase signal;
  in each time window, add a time offset to a selected group of carrier signals, thereby generating a shifted rectified DC output; wherein said selected group includes different carrier signals in at least two different time windows in said set of time windows;
  generate control signals for the plurality of switches so to supply the shifted rectified DC output to the DC load.

With this aspect of the invention, similar advantages and preferred features are present as in the previously discussed aspects of the invention.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF THE INVENTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
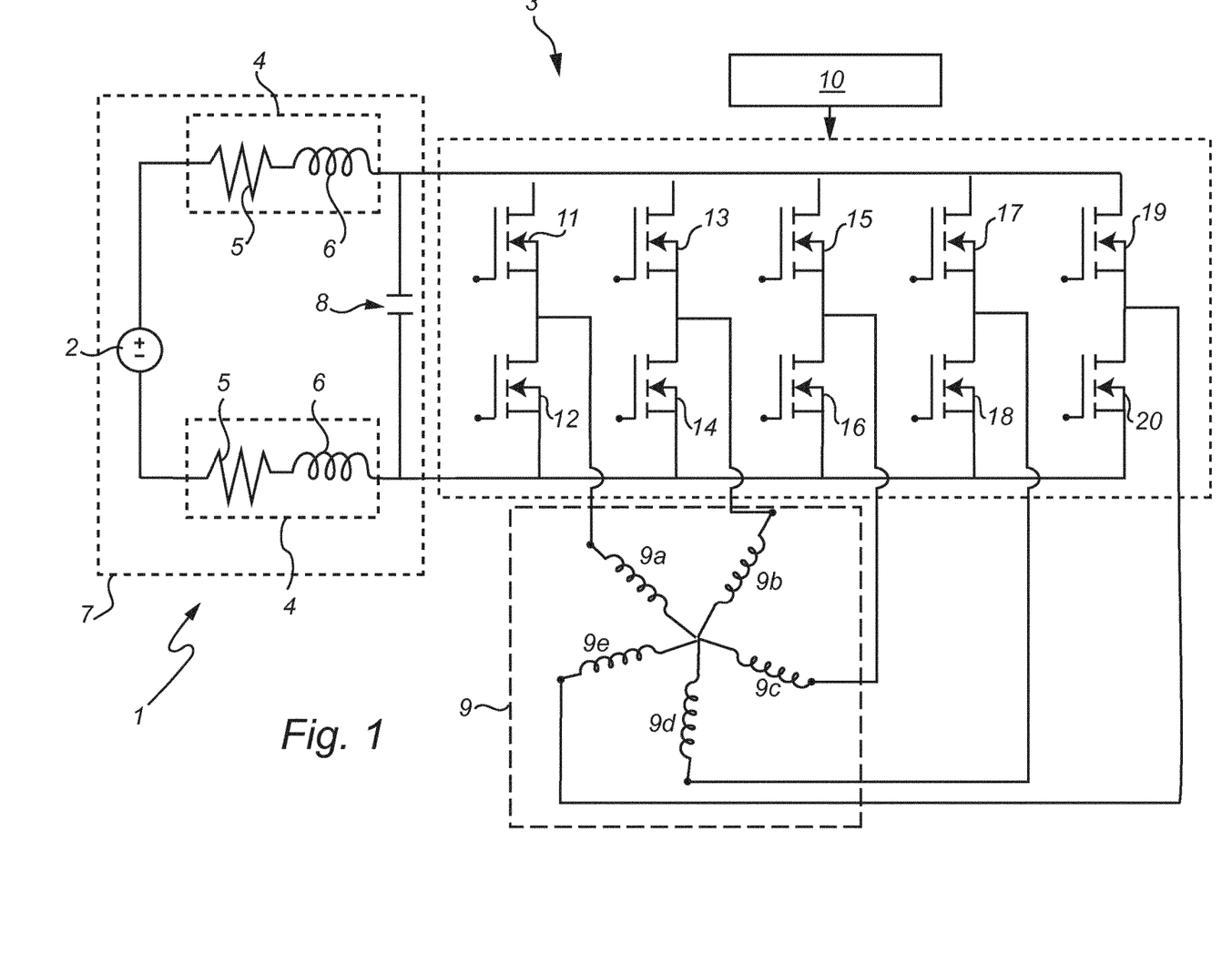
FIG. 1 illustrates a schematic circuit diagram of a multiphase electric motor system in accordance with an embodiment of the present invention.

In FIG. 1, a schematic illustration of an electric machine control system 1 is illustrated. Even if the following description will mainly be in reference to a multiphase electric motor, the skilled artisan readily understands how the same principles are applied to a multiphase electric generator.

The system comprises a DC source 2 by which a supply voltage is provided to the inverter circuit 3 via conductors/wires. The conductors being represented by a series inductance 6 and resistance 5. Further, a filter 8 is connected in parallel between the inverter circuit 3 and the DC feed circuit 7. In this embodiment, the filter 8 is illustrated as a single capacitor, however, it is readily understood by one skilled in the art that any filter circuit or capacitor bank which provides the same functionality may be used in the various embodiments of the invention.

The inverter circuit 3 includes 10 switches, 11-20 arranged in half bridge configurations, one for each of the five phases of the five phase electric motor 9. Even though that this particular embodiment is illustrated with n-channel MOSFETs (metal oxide semiconductor field effect transistors) it is understood that this is for illustrative purposes only. Accordingly, the invention is not limited in this regard. Instead any type of switch element or circuit which provides the same functionality as the switches illustrated in the exemplary embodiment may be used (e.g. IGBTs, insulated gate bipolar transistors). Moreover, the switches may comprise a diode connected in an anti-parallel fashion with a transistor, so to protect from any occurrences of reverse voltage at the drain to source of the transistors (not illustrated). Moreover, the employment of half bridges for controlling electrical motors is well-known in the art, and won't be discussed in any particular detail as it will be readily appreciated by one skilled in the art how the present invention may be practiced without these specific details A controller 10, is configured to operate the inverter circuit 3 to achieve a desired power flow between the DC source 2 and the motor 9 and to reduce the voltage ripple as compared to conventional systems, as will be described below. The controller may also be configured and used for taking measurements of motor phase currents, rotor position/speed, DC output voltage, and/or motor speed or torque commands as inputs and for carrying out a motor control algorithm to generate a set of multiphase modulation signals. The controller is preferably a microprocessor any other equivalent type of computing device, and may be realized as a software controlled processor. However, the controller may alternatively be realized wholly or partly in hardware.

The controller 10 may be configured to perform pulse width modulation by comparing a modulation signal (sine wave) with carrier signals and driving the input gates of each switch 11-20.

In the following, the operation of the controller will be discussed partly in reference to FIGS. 2A and 2B, and partly in reference to FIG. 3. FIG. 2B illustrates a conventional non-shifted multiphase (five-phase) motor supply signal formed by the modulated phase signals A', B', C', D', E' and the resulting DC bus ripple 21a, 21b measured across the filter 8. The modulated signals are in the illustrated as current signals as a function of time, while the DC bus ripple is illustrated as voltage ripple as a function of time.

The controller 10 is configured to generate control signals for the plurality of switches 11-20 so to generate a modulated phase signal A, B, C, D, E for each of the five phases of the electric motor 9. The control signals may for example be produced by pulse width modulation as illustrated in FIG. 3, where the carrier signals (303, 403) are modulated with modulation signals (301, 401) thereby producing a PWM signal used to drive the gates of each switch 11-20, in order to generate the multiphase motor supply/drive signal.

Further, the controller 10 is configured to provide a set of time windows 31-40 in each period of the five phase motor supply signal. The set of time windows 31-40 is only indicated in one arbitrarily selected period P to minimize clogging of the figure, however, it is understood that this operation is preferably continuously applied.

In each time window 31-40, the controller is configured to modify at least two of the modulated phase signals by adding a time offset to the carrier signal used to generate those modulated signals in a first time window 31, or equivalently, generating those modulated signals by using an already "offset" carrier signal.

For example, the first group may include signals C and D. Accordingly in the first time window 31, a time offset is added to the carrier signal used to generate C and D. See for example carrier signal 303 in the upper graph in FIG. 3 which is phase shifted relative to the carrier signal 403 in the lower graph in FIG. 3, by a time offset 405. Similar or the same results would be achieved if the other remaining modulated phase signals (A, B and E) were to be modified in the first time window instead, i.e. if they would form the first group instead.

Continuingly, a time offset is added to a group of carrier signals associated with different group of modulated phase signals (e.g. A and B) in the second time window 32. The added time offset may correspond to 90° of the carrier frequency or 180° of the resonance frequency of the system, depending on the operating mode or application, and can for example be performed by adding that time offset to the carrier wave used to form the modulated signals of the selected group and not to the carrier wave used to form the remaining modulated signals.

Figure 2A:
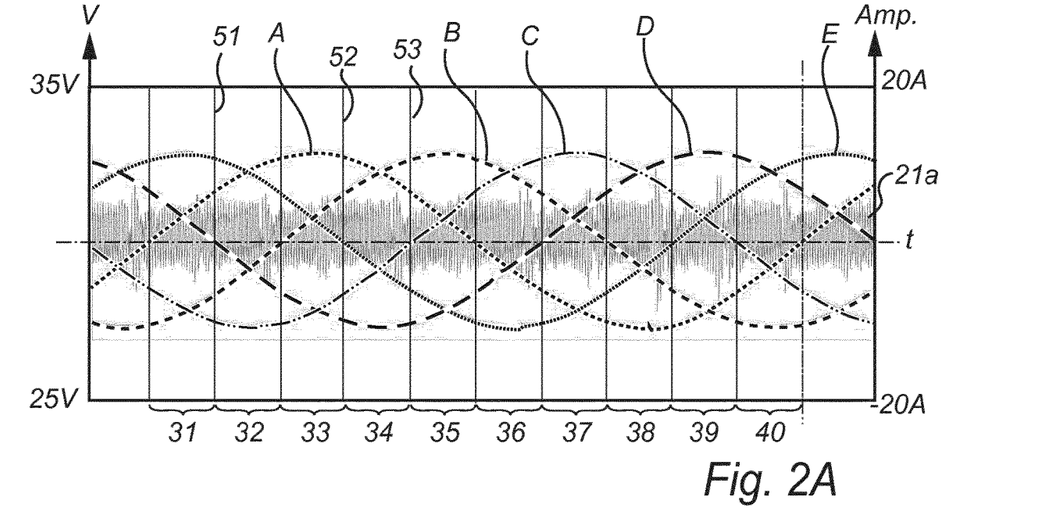
FIG. 2A is a graph showing current as a function of time in a five phase electric motor in a multiphase electric motor system in accordance with an embodiment of the present invention.
Figure 2B:
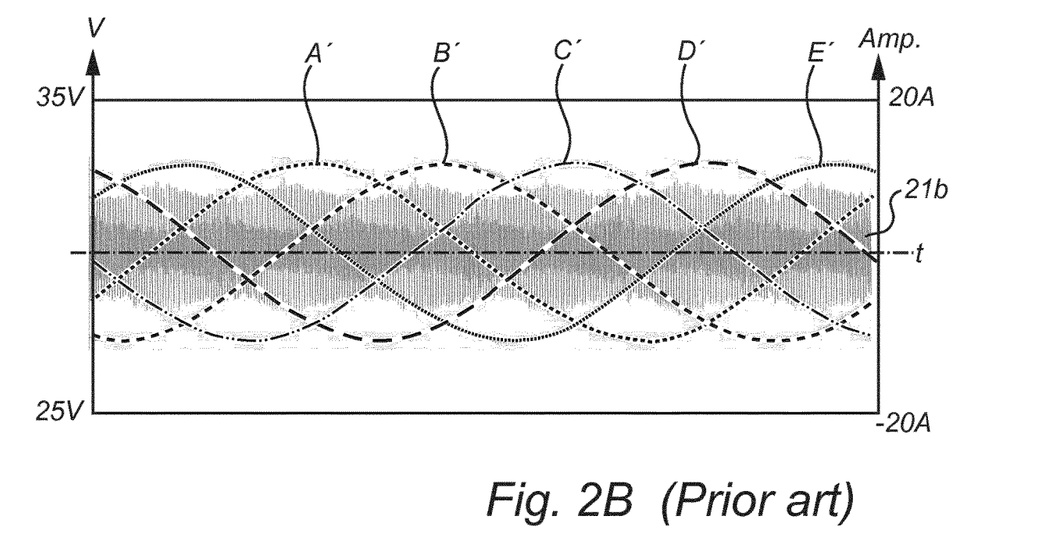
FIG. 2B is a graph showing current as a function of time in a five phase electrical motor in a conventional multiphase electric motor system.
Figure 3:
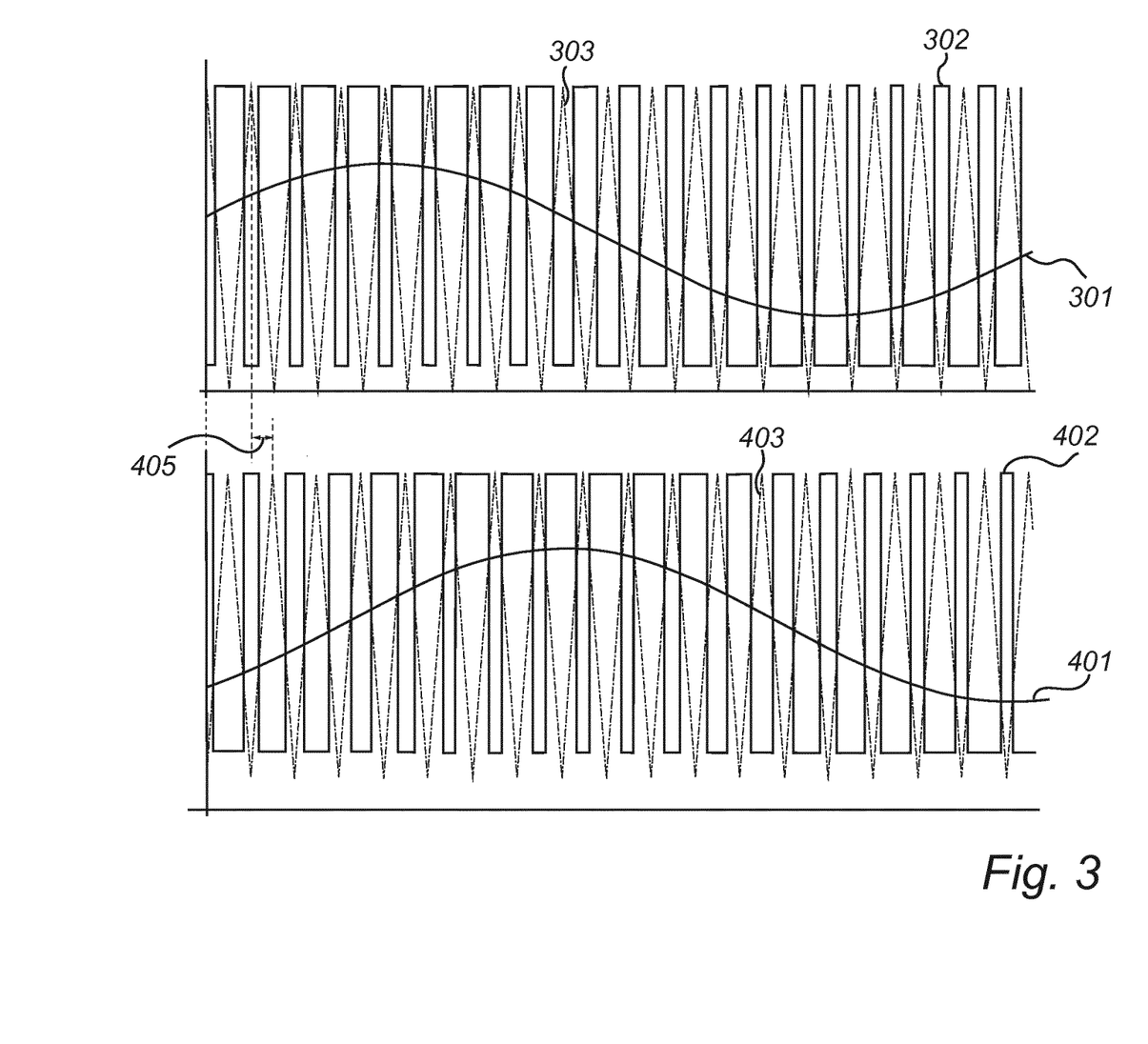
FIG. 3 illustrates two graphs showing a comparison of modulation of two carrier signals and the resulting PWM output.

The operation of defining a set of time windows can be understood as, defining a set time windows that each period should include and dividing the period, i.e. $2\pi=360°$ with that number, for example 10, as in the illustrated example of FIG. 2A. This results in that for each 36° "step" of the motor supply signal, a new time window begins. Or, if the motor is driven by a 50 Hz motor signal, a new time window will be formed at approximately at every 2 ms interval. Thus, during the operation of the motor, the controller is configured to add a time offset to a new selected group of carrier signals every 2 ms, if the motor is supplied with a signal of a constant frequency of 50 Hz.

This operation of modifying a selected group of signals, by adding a time offset or "delaying" the associated carrier signals, is analogously performed in each time window 31-40, whereby a resulting shifted/modified/altered five phase motor signal is generated. This shifted five phase motor supply signal is then supplied to the five phase electric motor 9.

Comparing the five phase motor signals of FIGS. 2A and 2B, it can be seen that the DC bus ripple in a system having a shifted five phase motor supply (FIG. 2A), according to an embodiment of the invention, has reduced DC bus ripple 21a, as compared to a non-shifted five phases motor supply signal (FIG. 2B)

Moreover, the controller 10 may be used to measure the resonance frequency of the system 1 by for example loading the conductors 4. The resonance frequency will mainly depend on the inductance and capacitance values of the conductors 4 and filter 8, respectively. Hence, for various systems having varying spatial setups and applications, the conductors/wires 4 will be of varying length and the filters will be of varying sizes, resulting in different resonance frequencies, accordingly by measuring the resonance frequency, installation is simplified and a more dynamic solution is achieved. The resonance frequency of the system 1 may alternatively be predetermined by calculating or approximating the resonance frequency by using known capacitance and inductance values for the filter 8 and conductors/wires 4 respectively. The resonance frequency may be determined by various known formulas or equations known by a skilled person in the art.

The selection of which modulated signals A, B, C, D, E should be used to form the group, in each time window 31-40, i.e. which of the modulated signals should be generated by using a delayed or offset carrier signal, can be done in some alternative ways as will be exemplified below.

In one embodiment, each group of modulated signals, in each time window 31-40 is selected such that a sum of a total current value of the selected group together with the total current value of the remaining modulated signals, at a predefined moment in time within the time window 31-40 is within the range of ±15% of a full load motor current.

For example, in time window 34, at a predefined moment in time, e.g. the moment indicated by line 52, the selected group can be chosen to include signals A and B, having a total current value of approximately 23 Ampere. The remaining signals C, D, and E have a total current value of approximately −24 Ampere, whereby a sum of the total current values is −1 Ampere, and if we assume a full load motor current of 20 Ampere we are well within the desired range [−3 A, 3 A]. Thus, the modulated phase signals A and B are selected to be modified by adding a time offset to the carrier signal used to generate those two modulated phase signals in order to reduce DC bus ripple. These signals (A and B) are then accordingly associated with a delayed or offset carrier signal until the end of that time window, indicated by line 53, and a new group of modulated phase signals to be modified is chosen. Analogously, the time offset could have been added to the carrier signals associated with C, D and E with the same result. However, as the skilled artisan realizes, there are other combinations of modulated signals to be used for forming the selected group which would fall within the desired range of the sum of total current values. Thus, an alternative condition may be to select each group of modulated signals, in each time window, such that a sum of a total current value of the selected group and the total current value of the remaining modulated signals is as close to 0 Ampere as possible.

Another example is to arrange each time window 31-40 to begin at a zero-crossing of one of the modulated signals, as illustrated in FIG. 2A. And, at that moment in time (zero-crossing, se for example line 51) to disregard the zero value signal D and select one of the signals having the highest current magnitudes C, E and one of the signals having the two lowest current magnitudes A, B, and select a group comprising the two selected signals, i.e. A+C, A+E, B+C or B+E (and optionally the zero value signal D) and add a time offset to the carrier signals associated with the selected group. Table 1 below illustrates an example of how the "modification" can be sequentially applied in each time window 31-40, where "X" indicates that the modulated signal (phase current) is modified (i.e. a time offset is applied to the carrier associated therewith). The time offset applied to the carrier wave may correspond to 90° of the carrier frequency (e.g. 22 μs at 22 kHz carrier frequency) or 180° of the systems resonance frequency. However, an equivalent solution would be to modify the modulated signals marked with "−" instead and leave the "X" signals un-modified. The "length" of each time window does not necessarily have to be and equal, but can be of varying lengths.

TABLE 1

| A | B | C | D | E | Time Window | Start | End |
|---|---|---|---|---|---|---|---|
| — | — | X | — | X | 31 | 54° | 90° |
| X | — | X | — | — | 32 | 90° | 126° |
| X | — | — | X | — | 33 | 126° | 162° |
| — | X | — | X | — | 34 | 162° | 192° |
| — | X | — | — | X | 35 | 192° | 234° |
| — | — | X | — | X | 36 | 234° | 270° |
| X | — | X | — | — | 37 | 270° | 306° |
| X | — | — | X | — | 38 | 306° | 342° |
| — | X | — | X | — | 39 | 342° | 18° |
| — | X | — | — | X | 40 | 18° | 54° |

Yet another example (suitable for a five phase electric motor system) would be to consider that for every moment in time, there is a phase current value in each phase A B C D E, which can be denoted as I=[$I_A$, $I_B$, $I_C$, $I_D$, $I_E$], and a reference voltage U=[$U_A$, $U_B$, $U_C$, $U_D$, $U_E$]. The reference voltage may however be computed to define a Duty Cycle D=[$D_A$, $D_B$, $D_C$, $D_D$, $D_E$].

The contribution to the current flowing in the feed circuit 7 will for each phase A, B, C, D, E be approximately equal to the phase current during the time the upper transistor 11, 13, 15, 17, 19 is on. The "upper transistor" is here considered to be the transistor connected between the positive electrode of the DC source 2 and the electric motor 9. Continuingly, the contribution to the current in the feed circuit 7 will for each phase A, B, C, D, E be approx. 0 Ampere during the time the lower transistor 12, 14, 16, 18, 20 is on. The "lower transistor" is here considered to be the transistor connected between the negative electrode of the DC source 2 and the electric motor 9. Consequently, this results in a pulse, for phase A, having a current amplitude $I_A$ and Duty Cycle $D_A$.

By using a Fourier series expansion, an expression for the 5 phases A, B, C, D, E, the current for the various overtones can be expressed as:

$$I_{x_n} = I_x \frac{2}{n\pi} \sin(\pi D_x n)$$

where x corresponds to phase A, B, C, D and E. Further, if the phase current is offset by a time offset relative to the switch frequency (carrier frequency), the phase of the phase currents is changed according to:

$$I_{(x_n)delay} = I_x \frac{2}{n\pi} \sin(\pi D_x n) e^{j(\alpha_x n)}$$

where $a_x$ corresponds to the added offset for phase x relative to the switch frequency. Further, by extracting the real and imaginary parts of this equation on reaches the following:

$$I_{(x_n)delay\ real} = I_x \frac{2}{n\pi} \sin(\pi D_x n) \cos(\alpha_x n)$$

$$I_{x_n delay\ imag} = I_x \frac{2}{n\pi} \sin(\pi D_x n) \sin(\alpha_x n)$$

On this background, the selection of a group of modulated signals to be modified may be selected by, computing the first overtone based on the Duty Cycle ($D_x$) and current ($I_x$) for each modulated signal. This information (duty cycle and current value) is readily accessible by the controller 10 and the fourier series can be quickly computed by the same. Based on the extracted values the modulated signal (phase current) having the highest value and the modulated signal having the lowest value are selected to form the group to be modified by adding a time offset to the carrier signal used to generate those two modulated signals. The added offset can for example correspond to 90° of the switching frequency (carrier frequency).

Figure 4:
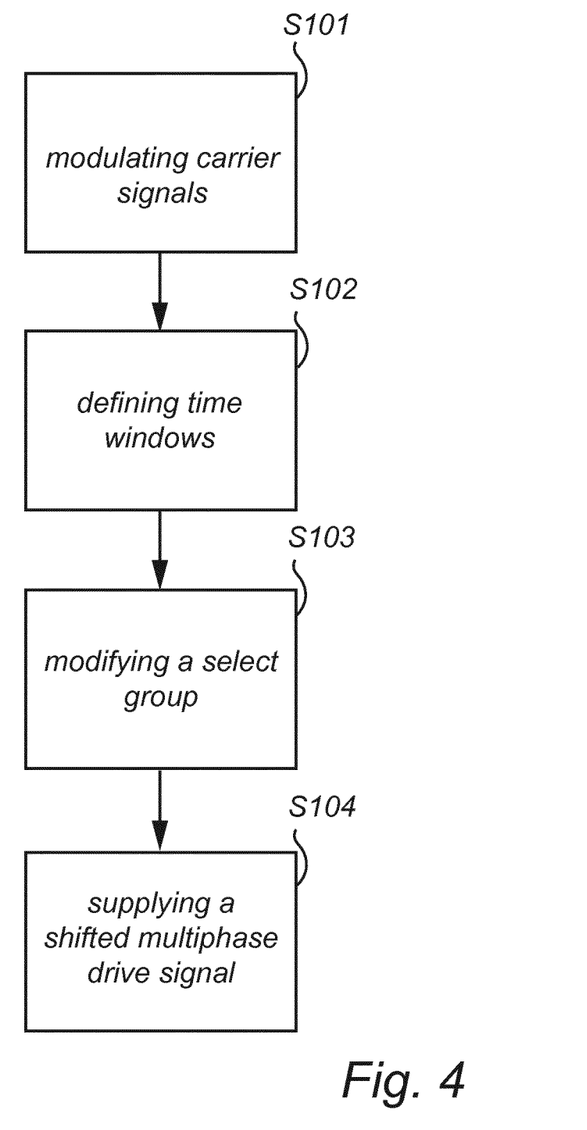
FIG. 4 is a schematic flow chart representation of a method for controlling a multiphase electric machine in accordance with an embodiment of the present invention.

FIG. 4 is a flow chart illustrating a method according to an embodiment of the present invention. Assuming an electric motor system according to any of the previously discussed embodiments, such as e.g. the one illustrated in FIG. 1. The method includes modulating S101, modulating a plurality of carrier signals with a plurality of modulation signals in order to generate a multiphase motor supply signal comprising a modulated phase signal for each of the 2N+1 phases of the electric motor.

Next, there is a step of providing, or defining S102 a set of time windows for each period of the multiphase motor supply signal. In other words, each period, is divided into a set of sequentially arranged time ranges. For example, in system comprising a five phase electric motor, each period of the motor supply signal can e.g. be divided into ten time windows corresponding to 36° each.

Further, a selected group of modulated phase signals is modified 102b, by adding a time offset to the carrier signal (s) used to generate those selected modulated signals in a first time window, and adding that time offset to a different group of carrier signals associated with a different selected group of modulated signals in a second time window, the time offset being applied in order to reduce DC bus ripple. Moreover, the groups are individually selected for each time window whereby the first group is different from the second group. Consequently, a time shifted multiphase motor supply signal will be generated.

An alternative way to think of the step of defining a set of time windows and modifying a selected group of signals in each time window would be to consider the it from a time domain perspective. For example, if the five-phase motor supply signal would have a fundamental frequency of 50 Hz, the period time is accordingly 20 ms. Continuingly, at a moment in time a group of modulated signals (phase currents) are selected and modified by adding an offset to the carrier signals associated with that selected group of modulated signals for a duration of 2 ms, after which duration of time, a new group of modulated signals (phase currents) are selected where the time offset is added to the carrier signals associated with the new group for a duration of 2 ms, and so on. In other words, the time windows can be understood as intervals between new signal/phase current selections.

Lastly, the time shifted multiphase motor supply signal is supplied S103 to the electric motor.

The invention has now been described with reference to specific embodiments. However, several variations of the electrical motor control system and method are feasible. For example, the control method may analogously be applied on multiphase electrical generators. Further, the controller may be configured to modulate the signal in numerous ways and with interchangeable components providing the same functionality. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for controlling a multiphase electric motor system comprising an inverter circuit coupled to a multiphase electric motor having 2N+1 phases, where N is a positive integer larger than 0, said method comprising:
    modulating a plurality of carrier signals with a plurality of modulation signals in order to generate a multiphase motor supply signal comprising a modulated phase signal for each of the 2N+1 phases;
    defining a set of time windows in each period of the multiphase motor supply signal;
    in each time window, modifying a selected group of modulated phase signals by adding a time offset to the carrier signal used to generate the selected group of modulated signals, thereby generating a shifted multiphase motor supply signal;
    wherein said selected group includes different modulated phase signals in at least two different time windows in said set of time windows;
    supplying the shifted multiphase motor supply signal to the multiphase electric motor.

2. The method according to claim 1, wherein said step of modifying a selected group of modulated phase signals is performed during the modulation of the plurality of carrier signals.

3. The method according to claim 1, wherein said set of time windows comprises at least 2(2N+1) time windows.

4. The method according claim 1, wherein said selected group of modulated phase signals is chosen, in each time window, such that a sum of a total current value of the selected group and the total current value of the remaining modulated phase signals, at a predefined moment in time in said each time window, is within the range of ±15% of a full load motor current.

5. The method according to claim 1, wherein said selected group of modulated phase signals comprises N or N+1 modulated phase signals.

6. The method according to claim 1 wherein the multiphase electric motor system further comprises a DC source connected to the inverter circuit and a DC bus filter connected in parallel with the DC source and the inverter circuit by conductors, wherein said method further comprises:
    determining the resonance frequency of the system by measuring the resonance frequency of the system, said resonance frequency being dependent on a capacitance of said DC bus filter and an inductance of said conductors.

7. The method according to claim 1, wherein said time offset corresponds to 90° of a carrier frequency of the inverter circuit or 180° of a resonance frequency of the system, depending on if the dominating frequency component of the voltage/current ripple across the DC bus filter is the second harmonic of the carrier frequency or the resonance frequency of the system, respectively.

8. A method for controlling a multiphase electric generator system comprising an active rectifier circuit coupled to a multiphase electric generator having 2N+1 phases, where N is a positive integer larger than 0, said method comprising:

providing a multiphase generator signal from the electric generator to the active rectifier circuit, wherein the multiphase generator signal includes 2N+1 phase signals;

providing a set of time windows in each period of the multiphase generator signal;

comparing a plurality of carrier signals with each of said 2N+1 phase signals in order to generate rectified DC output, wherein each carrier signal is associated with a specific phase signal;

in each time window, adding a time offset to a selected group of carrier signals, thereby generating a shifted rectified DC output;

wherein said selected group includes different carrier signals in at least two different time windows in said set of time windows;

supplying the shifted rectified DC output to a DC load.

9. An electric motor system comprising:
a DC source and a DC bus filter connected by conductors in parallel with the DC source, said conductors having an inductance
an electric motor having 2N+1 phases, where N is a positive integer larger than 0;
an inverter circuit connected between the filter and the electric motor, said inverter circuit comprising a plurality of switches;
a controller configured to:
modulate a plurality of carrier signals with a plurality of modulation signals in order to generate a multiphase motor supply signal comprising a modulated phase signal for each of the 2N+1 phases;
define a set of time windows in each period of the multiphase motor supply signal;
in each time window, modify a selected group of modulated phase signals by adding a time offset to the carrier signal used to modulated the selected group of modulated signals, thereby generating a shifted multiphase motor supply signal;
wherein said selected group includes different modulated phase signals in at least two different time windows in said set of time windows;
generate control signals for the plurality of switches so to supply the shifted multiphase motor supply signal to the multiphase electric motor.

10. The electric motor system to claim 9, wherein said controller is further configured to:
form said selected group of modulated signals, in each time window, such that a sum of a total current value of the selected group and the total current value of the remaining modulated signals, at a predefined moment in time in said each time window, is within the range of ±15% of a full load motor current.

11. The electric motor system according to claim 9, wherein said controller is further configured to determine a resonance frequency of the system, said resonance frequency being dependent on a capacitance of said DC bus filter and an inductance of said conductors.

12. The electric motor system according to claim 9, wherein said time offset corresponds to 90° of a carrier frequency of the inverter circuit or 180° of the resonance frequency of the system, depending on if the dominating frequency component of the voltage/current ripple across the filter is the second harmonic of the carrier frequency or the resonance frequency of the system, respectively.

13. An electric generator system comprising:
a DC load and a DC bus filter connected by conductors in parallel with the load, said conductors having an inductance;
a multiphase electric generator having 2N+1 phases, where N is a positive integer larger than 0;
an active rectifier circuit connected between the filter and the electric generator, said active rectifier circuit comprising a plurality of switches,
wherein said multiphase generator is configured to provide a multiphase generator signal to the active rectifier circuit, said multiphase generator signal including 2N+1 phase signals;
a controller configured to:
provide a set of time windows in each period of the multiphase generator signal;
compare a plurality of carrier signals with each of said 2N+1 phase signals in order to generate a rectified DC output, wherein each carrier signal is associated with a specific phase signal;
in each time window, add a time offset to a selected group of carrier signals, thereby generating a shifted rectified DC output;
wherein said selected group includes different carrier signals in at least two different time windows in said set of time windows;
generate control signals for the plurality of switches so to supply the shifted rectified DC output to the DC load.

* * * * *